A. C. SMITH.
STOVEPIPE END LOCK.
APPLICATION FILED JULY 8, 1911.

1,051,461.

Patented Jan. 28, 1913.

Inventor
Albert C. Smith

Witnesses

By Victor J. Evans
Attorney

UNITED STATES PATENT OFFICE.

ALBERT C. SMITH, OF MOCCASIN, ILLINOIS.

STOVEPIPE-END LOCK.

1,051,461.   Specification of Letters Patent.   Patented Jan. 28, 1913.

Application filed July 8, 1911. Serial No. 637,416.

*To all whom it may concern:*

Be it known that I, ALBERT C. SMITH, a citizen of the United States, residing at Moccasin, in the county of Effingham and State of Illinois, have invented new and useful Improvements in Stovepipe-End Locks, of which the following is a specification.

The present invention relates to stove pipe locks and has particular application to certain novel and useful improvements in stove pipe end locks for connecting the ends of straight pipe sections, elbows and the like.

In the present instance it is my purpose to provide a form of stove pipe end lock whereby the adjacent ends of two pipe sections may be quickly and securely joined together so that in addition to saving time and labor ordinarily incident to riveting the sections together, I provide a construction which will hold the pipes against accidental separation or disconnection.

Still a further object of the invention is to provide a stove pipe end lock by means of which the sections may be readily connected by one person, and it is further my aim to provide a stove pipe connection embodying the desired features of simplicity, durability and strength.

With the above recited objects and others of a similar nature in view, my invention consists in the construction, combination and arrangement of parts set forth in and forming the scope of the appended claim.

Figure 1:
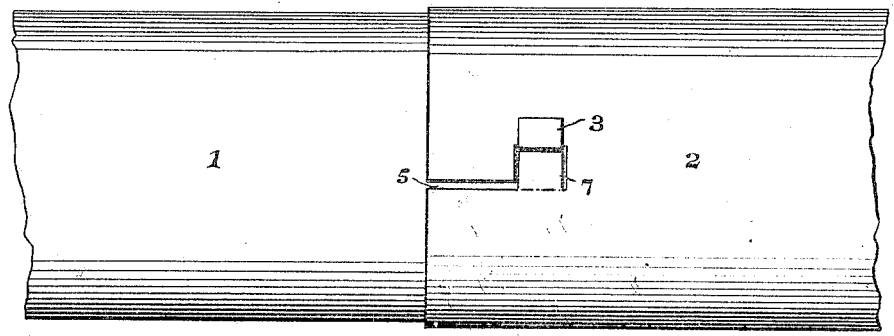
Figure 2:
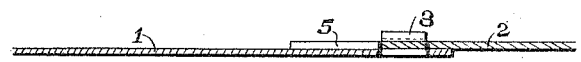
Figure 4:
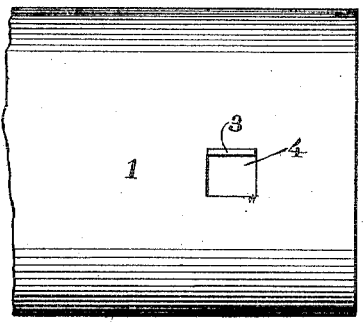
Figure 3:
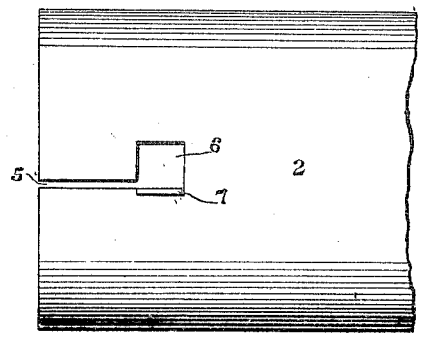

In the accompanying drawings:—Figure 1 is a view in elevation of two pipe sections joined or connected by my improved lock. Fig. 2 is a detail longitudinal section of the stove pipe lock, showing the members connected together. Fig. 3 is a detail view in elevation of one of the sections having a bayonet slot and the lug therefor. Fig. 4 is a similar view of the adjacent section of the pipe.

Referring now to the accompanying drawing, in detail, the numeral 1 indicates one of the sections of pipe adapted to have its end inserted within and joined to the adjacent section 2. At an appropriate point and adjacent to the end thereof, the section 1 has stamped or cut therefrom a lug 3 which is bent outwardly as shown in Fig. 4 and thus leaves an opening or aperture as shown at 4. The section 2 of the pipe which receives the section 1 is, at a suitable point adjacent to the end thereof, formed with an aperture or opening 6, said opening being formed by stamping from the pipe a lug 7 and leading from the opening 6 to the pipe section 2 is a narrow slot 5 opening onto the adjacent edge of the pipe section. The slot and the opening 6 in the pipe section 2 are adapted for the reception of the lug 3 on the pipe section 1.

From the description, the construction and manner of employing my invention will be readily apparent. Prior to connecting the sections the lugs are bent at an angle relative to the pipe sections and the section 1 has its end then inserted within the section 2, so that the upright lug of the section 1 passes along the relatively narrow slot 5 to the opening 6 thereof. The pipe section 1 is then given a slight twist to carry the lug of the section 1 across the opening 6. The lug 3 on the section 1 is then bent back onto the section 2, while the lug 7 of the section 2 is moved into the opening 6 of the respective section and over the opening 4 of the section 1 so that a secure lock joint is formed.

It will be noted that I have provided an exceedingly simple yet efficient form of lock which will hold the two sections of pipe firmly together and which will obviate the necessity of employing rivets or the like, thereby not only avoiding the expenditure of time in connection with the pipe but also dispensing with the employment of two or more persons to rivet the sections. By means of my invention, a number of sections may be joined, and these sections may be of any character such as straight, elbow or the like.

Having described the invention, I claim:—

In combination, two pipe sections having their adjacent ends telescoped, one of said sections being formed adjacent to one end with an opening, and a lug on one side of the opening, and the other section having formed in its adjacent end an opening with a lug on one side of the opening, and a longitudinal slot leading from the said opening and lug to the adjacent end of the section, the lug on the first section projecting through the opening in the second section and bent back onto said section, and the lug on the second section being bent into the opening in said section and closing the opening in the first section.

In testimony whereof I affix my signature in presence of two witnesses.

ALBERT C. SMITH.

Witnesses:
 CHAS. E. DAVIS,
 J. L. BRUMMERSTEDT.